United States Patent
Kitazawa et al.

(10) Patent No.: US 7,010,966 B2
(45) Date of Patent: Mar. 14, 2006

(54) SPM CANTILEVER AND FABRICATING METHOD THEREOF

(75) Inventors: Masashi Kitazawa, Ina (JP); Koichi Shiotani, Tatsuno-machi (JP); Akitoshi Toda, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/694,358

(22) Filed: Oct. 28, 2003

(65) Prior Publication Data

US 2004/0084737 A1    May 6, 2004

(30) Foreign Application Priority Data

Oct. 29, 2002    (JP) .............................. 2002-313599

(51) Int. Cl.
*G01B 5/28*    (2006.01)

(52) U.S. Cl. ..................................................... 73/105
(58) Field of Classification Search ................. 73/105; 250/306, 307; 216/11
See application file for complete search history.

(56) References Cited

U.S. PATENT DOCUMENTS

| 5,811,017 A | * | 9/1998 | Matsuyama | 216/11 |
| 6,246,054 B1 | * | 6/2001 | Toda et al. | 250/306 |
| 6,415,653 B1 | * | 7/2002 | Matsuyama | 73/105 |

FOREIGN PATENT DOCUMENTS

| JP | 2624873 | 4/1997 |
| JP | 2984094 | 9/1999 |

* cited by examiner

*Primary Examiner*—Robert Raevis
(74) *Attorney, Agent, or Firm*—Westerman, Hattori, Daniels & Adrian, LLP

(57) ABSTRACT

Disclosed herein is SPM cantilever having a support portion, a lever portion extended from the support portion and a probe portion formed at a free end of the lever portion, said probe portion having a generally plate-like form and the probe portion having an additionally sharpened terminal end portion. The terminal end portion has its length greater than the plate thickness thereof and is reduced in thickness toward a tip of the terminal end portion, and the tip is located inwardly of the planes extended from the front and back sides of a base portion of the plate-like probe portion.

2 Claims, 7 Drawing Sheets

SPM CANTILEVER AND FABRICATING METHOD THEREOF

This application claims benefit of Japanese Application No. 2002-313599 filed in Japan on Oct. 29, 2002, the contents of which are incorporated by this reference.

BACKGROUND OF THE INVENTION

The present invention relates to SPM cantilevers and fabricating methods thereof for use in Scanning Probe Microscopies (SPM) such as Atomic Force Microscopy (AFM).

Scanning Probe Microscopies (SPM), apparatus having an atomic-order measuring resolution such as for use in measuring surface irregularities, are now widely used. In recent years, however, measurements at yet higher resolutions are demanded. For this reason, it is desirable for the cantilever used in SPM to be provided with a probe portion sharpened at its terminal end and at the same time having high aspect ratio.

Among such SPM cantilevers is a cantilever as disclosed in Japanese Patent No.2624873. The SPM cantilever uses a silicon oxide film as the lever material. In particular, a resist film is formed on the surface of a thermally oxidized silicon film having a thickness of 1 to 2 $\mu$m and a sharpened portion is formed in the resist film by using photoetching technologies. A silicon oxide film probe portion having a smaller radius of curvature than the sharpened portion formed of the resist film is then formed by effecting an isotropic etching by a buffer etching solution. With such fabricating method of SPM cantilever, an SPM probe portion can be formed as having a radius of curvature of 0.1 $\mu$m or less at its terminal end by using the conventional photoetching technologies and also as having favorable adhesion between a cantilever support portion and the lever by using the thermally oxidized silicon as the lever material.

Further, a processing method of cantilever using focused ion beam (FIB) has been disclosed in Japanese Patent No.2984094. In the processing method, a focused ion beam is caused to irradiate a probe's terminal end portion with arbitrarily changing the scanning direction so as to process the probe terminal end portion into a sharpened form. With such processing method of cantilever, it is possible to arbitrarily change the vertical angle at a terminal end of the probe and to vary an aspect ratio thereof. At the same time the radius of curvature of the terminal end of the probe can be processed into 50 nm or less.

Figure 1:
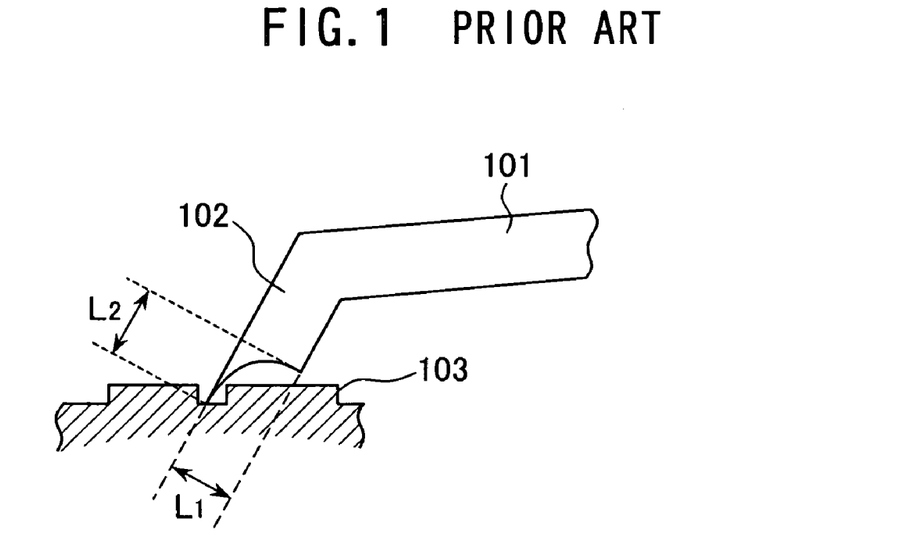
FIG. 1 typically shows the relation between the probe's terminal end of the conventional SPM cantilever and a sample to be measured.

The previously suggested cantilevers as described above, however, have problems as follows. First, a problem in the cantilever disclosed in Japanese Patent No.2624873 is that it becomes impossible to accurately ascertain the surface irregularities of a sample, even though the terminal end of the probe can be sharpened. This problem will be described below with reference to FIG. 1. FIG. 1 shows the relation between the probe's terminal end and a sample to be measured, including: a lever portion 101; a plate-like probe portion 102 of silicon oxide film formed on a free end of the lever portion; and a sample 103 to be measured. Supposing as shown in FIG. 1, $L_1$ as the plate thickness of the probe portion and $L_2$ as the length of the sharpened terminal end portion formed by etching in the case where an isotropic wet etching of the plate-like silicon oxide film probe portion 102 is effected by using a resist mask, $L_1$ and $L_2$ are equal to each other in length or, more likely, the relationship of $L_1>L_2$ holds due to the fact that the terminal end portion is etched away also from sides of the resist mask. Accordingly, length $L_2$ of the probe terminal end portion to be sharpened becomes shorter. If this is used in measuring the sample 103 which has relatively large irregularities, those portions other than the probe's terminal end are brought into contact with the irregularities of the sample 103 to be measured so that it becomes impossible to accurately ascertain configuration of the irregularities.

Also, since the silicon oxide is etched away in a short time period by fluoric acid, the fabrication of a sharpened probe portion of the order of nanometers with controlling variance thereof is difficult due to the variance in etching if a plurality of cantilevers each having probe portion are to be fabricated within a wafer.

Of the cantilever disclosed in Japanese Patent No.2984094, on the other hand, though the forming of a probe portion having high aspect ratio is possible, the radius of curvature of the terminal end of the probe portion is difficult to be regulated to result a lower yield, since FIB processing must be performed for each one cantilever. Also, in the case of a thin lever portion, warping of the lever might be caused due to damage or heat in the FIB processing. Further, in addition to the expensiveness of FIB apparatus, there is a problem of increased cost for example because of the excessively long time to be consumed in forming several hundred cantilevers on a wafer.

SUMMARY OF THE INVENTION

It is an object of the present invention to provide a cantilever having a silicon nitride probe portion and simple fabricating method thereof in which a terminal end of the probe portion is sharpened in a well regulated manner and which is capable of adopting a high aspect ratio, processed at high yield and also capable of reducing costs.

It is another object of the invention to provide a fabricating method of cantilever in which a cantilever having a sharpened probe portion can be readily fabricated without depending on the surface irregularities of a substrate as far as the substrate is capable of being covered by a silicon nitride film. It is a further object of the invention to provide a fabricating method of cantilever in which a terminal end of probe can be sharpened even if a very thin lever material is used.

In a first aspect of the invention, there is provided SPM cantilever having a support portion, a lever portion extended from the support portion and a probe portion formed at a free end of the lever portion. The probe portion has a generally plate-like form and the probe portion has an additionally sharpened terminal end portion. The terminal end portion has its length greater than the plate thickness thereof and is reduced in thickness toward a tip of the terminal end portion. The tip is located inwardly of the planes extended from the front and back sides of a base portion of the plate-like probe portion.

The SPM cantilever according to the first aspect may employ a construction where the probe portion is generally triangular and two sides containing the terminal end portion are inwardly bent.

In a second aspect of the invention, there is provided SPM cantilever having a support portion, a lever portion extended from the support portion and a probe portion formed at a free end of the lever portion. The probe portion is generally pyramidal or conic and the pyramidal or conic probe portion has an additionally sharpened terminal end portion.

The SPM cantilever according to the second aspect may employ a construction where the probe portion is generally in the form of a triangular pyramid or in the form of a circular cone.

The SPM cantilever according to the first or second aspect may employ a construction where the probe portion is formed of silicon nitride.

In a third aspect of the invention, there is provided a fabricating method of SPM cantilever having a support portion, a lever portion extended from the support portion, and a probe portion formed at a free end of the lever portion, including the steps of: depositing a silicon nitride film to become the probe portion and the lever portion on a silicon substrate derived from silicon wafer; patterning the silicon nitride film deposited on the silicon substrate into a configuration having an acute angle portion for forming the probe portion; forming a protecting film with exposing the acute angle portion of the patterned silicon nitride film; effecting a low-temperature thermal oxidation of the exposed acute angle portion of the silicon nitride film; and forming a sharpened probe portion by removing by means of fluoric acid the oxidized portion on the surface of the acute angle portion of the silicon nitride film treated of the low-temperature thermal oxidation.

In a fourth aspect of the invention, there is provided a fabricating method of SPM cantilever having a support portion, a lever portion extended from the support portion, and a probe portion formed at a free end of the lever portion, including the steps of: forming a silicon projection for forming the probe portion on a silicon substrate derived from silicon wafer; depositing a silicon nitride film to become the probe portion and the lever portion on the silicon substrate having the silicon projection formed thereon; effecting a low-temperature thermal oxidation of the silicon nitride film formed on the projection of the silicon substrate; and forming a sharpened probe portion by removing by means of fluoric acid the oxidized portion on the surface of the silicon nitride film treated of the low-temperature thermal oxidation.

The silicon nitride film in the fabricating method of SPM cantilever according to the third or fourth aspect preferably has a silicon content in terms of an elemental ratio between silicon and nitrogen greater than 3:4.

The silicon nitride film in the fabricating method of SPM cantilever according to the third or fourth aspect is preferably formed by chemical vapor deposition.

The low-temperature thermal oxidation in the fabricating method of SPM cantilever according to the third or fourth aspect is effected preferably at oxidizing temperatures above 900° C. and below 1050° C.

The low-temperature thermal oxidation on the silicon nitride film in the fabricating method of SPM cantilever according to the third or fourth aspect is preferably effected so that an oxide film having a film thickness of 50 nm or more be formed on (100) silicon lattice plane of the silicon substrate adjacent thereto.

In a fifth aspect of the invention, there is provided SPM cantilever fabricated by a fabricating method of cantilever having a support portion, a lever portion extended from the support portion, and a probe portion formed at a free end of the lever portion, including the steps of: depositing a silicon nitride film to become the probe portion and the lever portion on a silicon substrate derived from silicon wafer; patterning the silicon nitride film deposited on the silicon substrate into a configuration having an acute angle portion for forming the probe portion; forming a protecting film with exposing the acute angle portion of the patterned silicon nitride film; effecting a low-temperature thermal oxidation of the exposed acute angle portion of the silicon nitride film; and forming a sharpened probe portion by removing by means of fluoric acid the oxidized portion on the surface of the acute angle portion of the silicon nitride film treated of the low-temperature thermal oxidation.

The SPM cantilever according to the fifth aspect may employ a construction where the probe portion is generally triangular and two sides containing a terminal end portion thereof are inwardly bent.

In a sixth aspect of the invention, there is provided SPM cantilever fabricated by a fabricating method of cantilever having a support portion, a lever portion extended from the support portion, and a probe portion formed at a free end of the lever portion, including the steps of: forming a silicon projection for forming the probe portion on a silicon substrate derived from silicon wafer; depositing a silicon nitride film to become the probe portion and the lever portion on the silicon substrate having the silicon projection formed thereon; effecting a low-temperature thermal oxidation of the silicon nitride film formed on the projection of the silicon substrate; and forming a sharpened probe portion by removing by means of fluoric acid the oxidized portion on the surface of the silicon nitride film treated of the low-temperature thermal oxidation.

The SPM cantilever according to the sixth aspect may employ a construction where the probe portion is generally pyramidal or conic.

The SPM cantilever according to the sixth aspect may employ a construction where the probe portion is generally in the form of a triangular pyramid or in the form of a circular cone.

The silicon nitride film in the SPM cantilever according to the fifth or sixth aspect preferably has a silicon content in terms of an elemental ratio between silicon and nitrogen greater than 3:4.

The silicon nitride film in the SPM cantilever according to the fifth or sixth aspect is preferably formed by chemical vapor deposition.

The low-temperature thermal oxidation in the SPM cantilever according to the fifth or sixth aspect is effected preferably at oxidizing temperatures above 900° C. and below 1050° C.

The low-temperature thermal oxidation on the silicon nitride film in the SPM cantilever according to the fifth or sixth aspect is preferably effected so that an oxide film having a film thickness of 50 nm or more be formed on (100) silicon lattice plane of the silicon substrate adjacent thereto.

BRIEF DESCRIPTION OF THE DRAWINGS

FIGS. 4A to 4I illustrate the fabricating steps for explaining the fabricating method of the cantilever according to the first embodiment shown in FIG. 2.

DESCRIPTION OF THE PREFERRED EMBODIMENTS

Figure 2:
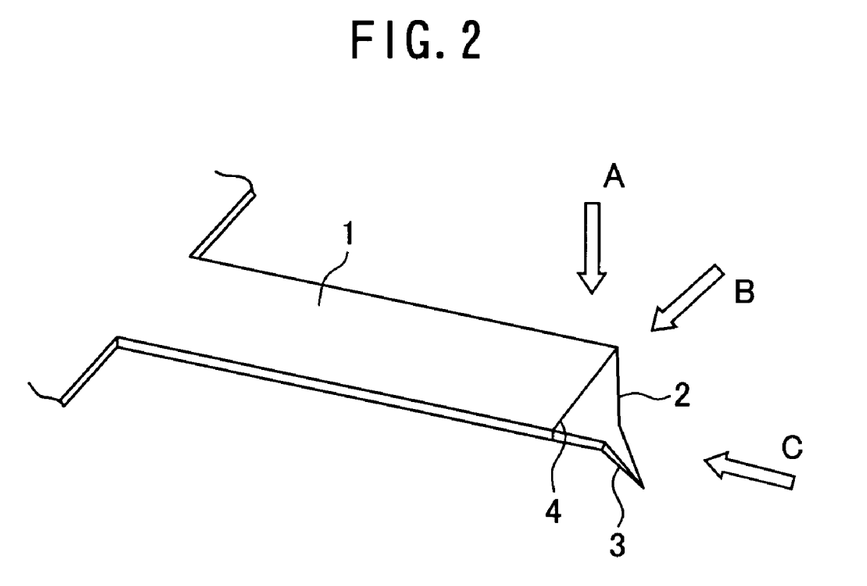
FIG. 2 is a partially omitted perspective view showing construction of a first embodiment of SPM cantilever according to the invention.
Figure 3A:
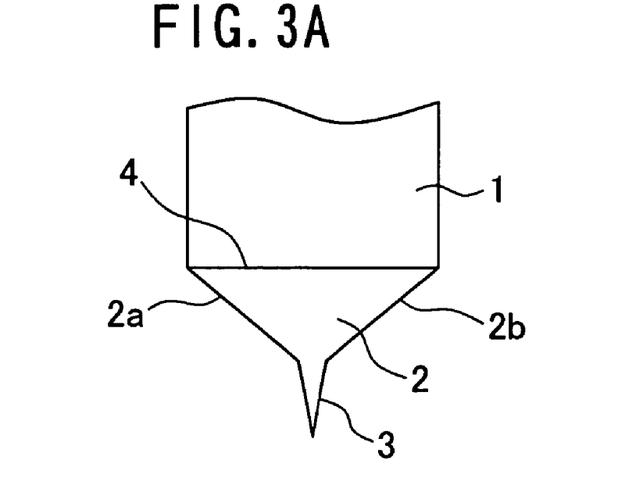
FIGS. 3A, 3B and 3C show the form of the probe portion of the cantilever according to the first embodiment as seen from the three directions of A, B, C shown in FIG. 2.
Figure 3B:
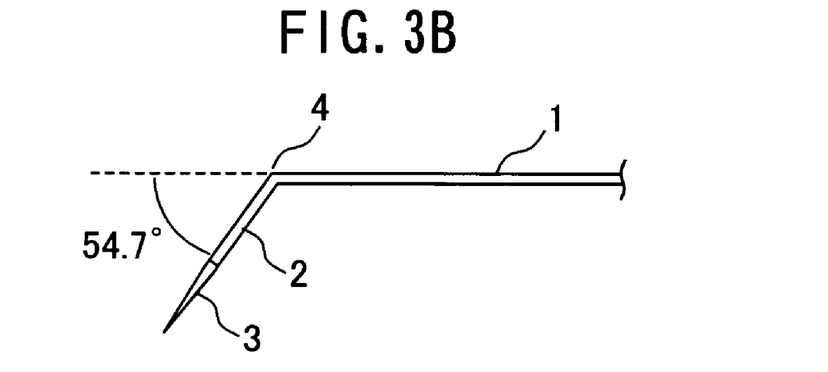
Figure 3C:
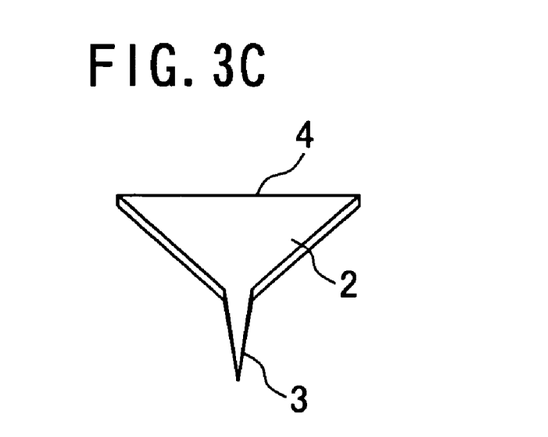

A first embodiment of the invention will now be described. An overall construction of the lever portion and probe portion of the first embodiment of SPM cantilever according to the invention is shown in FIG. 2, and the configurations as seen from the directions of A to C in FIG. 2 of the probe portion are shown in FIGS. 3A, 3B and 3C, respectively. As shown in these figures, a probe portion 2 is formed toward the free end of a lever portion 1. Here the probe portion 2 is constituted by a plate-like thin film formed toward the free end of the lever portion 1, and an acutely angled terminal end portion 3 of the probe portion 2 is located at the free end of the lever.

The probe portion 2 is inclined by an angle of 54.7 degrees corresponding to the lattice plane (111) of silicon with respect to the lever portion 1 at its boundary 4 to the lever portion 1. Further, two sides 2a, 2b of the probe portion 2 that contain the terminal end portion 3 are bent toward the inner side. In other words, it is formed into such a shape that, of the portions having the same width as the lever portion 1, those portions unnecessary as the probe portion 2 are cut off. By such construction, the weight of the probe portion 2 is reduced so that a drop in resonance frequency can be prevented. At the same time, an aspect ratio of the configuration of the terminal end portion 3 of the probe portion 2 is improved so that a sample of narrower measurement intervals can be measured. Further, a damping in cantilever oscillation due to the air or water surrounding the cantilever can be reduced. The terminal end portion 3 of the probe portion 2 has a radius of curvature of 20 nm or less and is very slender as having its length exceeding the plate thickness (film thickness), i.e., the probe structure has a probe terminal end portion of high aspect ratio.

The SPM cantilever having such construction makes it possible to achieve an SPM cantilever having a probe portion of the structure by which a sufficient measurement down to a bottom surface of concave is possible even if the sample has surface irregularities of relatively large aspect ratio. Also, since the terminal end of the probe portion can be brought into contact substantially vertically with the sample to be measured, measurements at high resolution become possible.

Figure 4A:
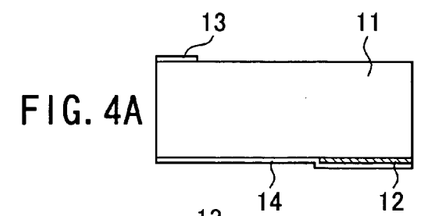

The fabricating method of SPM cantilever according to the first embodiment having the above described construction will now be described by way of the fabricating steps shown in FIGS. 4A to 4I. First, a silicon wafer of lattice plane (100) having Orientation Flat in <011> direction is prepared and used as a substrate 11. As shown in FIG. 4A, then, a mask 12 for the cantilever support portion is formed on the back side of the silicon substrate 11. Here a silicon oxide film for example is suitably used as the mask 12. A mask 13 for forming the probe portion is formed by a silicon nitride film at a predetermined location. At the same time, a silicon nitride film 14 for protecting the cantilever support portion mask 12 is formed on the back side of the silicon substrate 11.

Figure 4B:
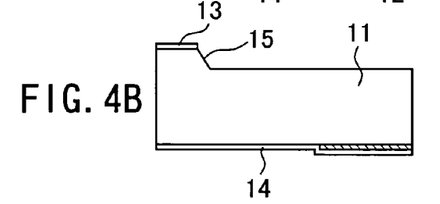

The silicon front side having the probe portion forming mask 13 thereon is then subjected to anisotropic wet etching by means of an alkali aqueous solution such as KOH (potassium hydroxide) or TMAH (tetramethyl ammonium hydroxide) to form a step difference 15 for forming the probe portion as shown in FIG. 4B on one side of the silicon substrate 11. The probe portion forming mask 13 and the back-side silicon nitride film 14 are then removed for example by heat phosphoric acid.

Figure 4C:
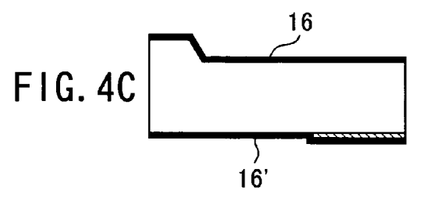

As shown in FIG. 4C, then, a silicon nitride film 16 to become the lever portion and probe portion is formed together with a back-side silicon nitride film 16'. Here the silicon nitride film 16, a silicon nitride film containing more silicon than a normally used silicon nitride film ($Si_3N_4$), is deposited by Low Pressure Chemical Vapor Deposition (LP-CVD).

In particular, this can be achieved by increasing the ratio of dichlorosilane to a level higher than normal in the flow of dichlorosilane and ammonia at the time of deposition. While the film thickness of silicon nitride is variable according to the desired characteristics, it in this case is 0.1 $\mu$m, rather thinner than a normally used silicon nitride cantilever film thickness of 0.4 $\mu$m, in anticipation of a cantilever having a resonance frequency of 1 MHz and spring constant of 0.1 N/m. Naturally, however, the film thickness of silicon nitride is not limited to such a value.

By as described using a silicon nitride film having a higher silicon content, in particular the silicon nitride film containing more silicon than an elemental ratio of 3:4 between silicon and nitrogen, warping at the lever portion or crack at the terminal end of the probe portion can be prevented. Further, the reaction of silicon atoms within the silicon nitride film and oxygen atoms is accelerated during the oxidation, resulting in an advantage of promoting the sharpening effect. Furthermore, use of CVD method in forming the silicon nitride film makes it possible to adjust the elemental ratio between silicon and nitrogen within the silicon nitride film so that a fine film having less internal stress be formed. Also, since the silicon nitride film can be formed on a substrate of various shapes or materials, the scope of its application can be widened.

Figure 4D:
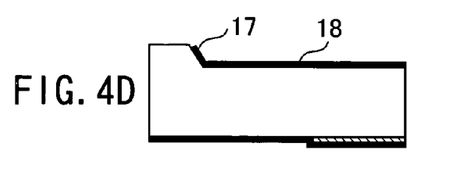

Next, as shown in FIG. 4D, the silicon nitride film 16 is patterned by photolithography and an etching of the silicon nitride film 16 is then effected for example by RIE (Reactive Ion Etching) to form a probe portion 17 and lever portion 18 of the pattern as previously shown in FIG. 2. At this time, the tip of the terminal end portion of the probe portion 17 suffices to have a small radius of curvature within a possible range. If, for example, the radius of curvature is of the order of 100 nm, a sufficiently small radius of curvature can be obtained in the succeeding steps as will be described later.

Figure 4E:
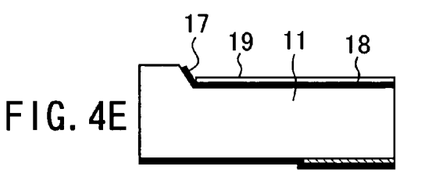

Subsequently, as shown in FIG. 4E, after depositing a silicon oxide film all over by CVD method to a thickness of about 0.5 $\mu$m, the silicon oxide film over the silicon substrate 11 at the probe portion 17 and a vicinity thereof is removed with preserving only the portion over the lever portion 18 as a protecting film 19.

Figure 4F:
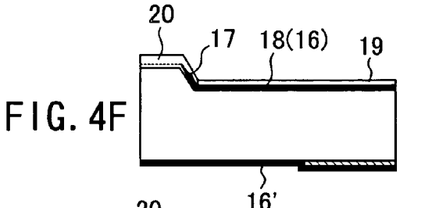

Next, the sharpening of the terminal end portion of the probe portion is effected. As shown in FIG. 4F, a low-temperature thermal oxidation treatment is effected to form a silicon oxide film 20 only over the silicon substrate 11 at the terminal end portion of the probe portion 17 and a vicinity thereof where the protecting film 19 is absent. It should be noted that the dotted line in FIG. 4F indicates the position of an upper surface of the silicon substrate 11 before the low-temperature thermal oxidation treatment. Here the low-temperature thermal oxidation treatment is effected in a steam atmosphere. To obtain a sharpening effect of the terminal end portion of the probe portion, the low-temperature thermal oxidation treatment is preferably effected at temperatures above 900° C. and below 1050° C. to an extent where the film thickness of the silicon oxide film formed on the silicon substrate surface in the vicinity of the probe portion 17 becomes 50 nm or more.

The reason for setting the temperature of the thermal oxidation treatment in this manner is that oxidation is caused to unevenly proceed from the front and back sides as well as from lateral faces of the silicon nitride film by lowering the oxidizing temperature so that a sharpened part can be formed on the silicon nitride film of the portion not oxidized. In other words, the silicon nitride film thickness at the terminal end portion of the probe portion becomes thinner so that a probe portion made of silicon nitride having a sharpened tip can be formed. It should be noted that a problem of longer treatment time due to lowered oxidation treatment rate occurs if the temperature of the low-temperature thermal oxidation treatment is lower than 900° C. Further, if it is set above 1050° C., the silicon nitride film, which is susceptible to thermal stress, is affected by thermal stress so that a problem of crack or the like is caused.

Further, the reason for defining the film thickness of the silicon oxide film to be formed on the vicinity silicon substrate surface as described above is as follows. If the thickness of the oxide film on the vicinity silicon substrate surface is thinner than 50 nm, the oxide film to be formed on the silicon nitride film also becomes thinner, i.e., only several nanometers so that a sufficient sharpening effect of the terminal end portion of the probe portion is difficult to be obtained. Accordingly, the film thickness of the silicon nitride at the terminal end portion of the probe portion 17 is reduced so as to make its tip sharpened by a low-temperature thermal oxidation treatment under the above described conditions, whereby the probe portion 17 can be obtained as having its terminal end portion sharpened in a relatively longer extent.

Figure 5A:
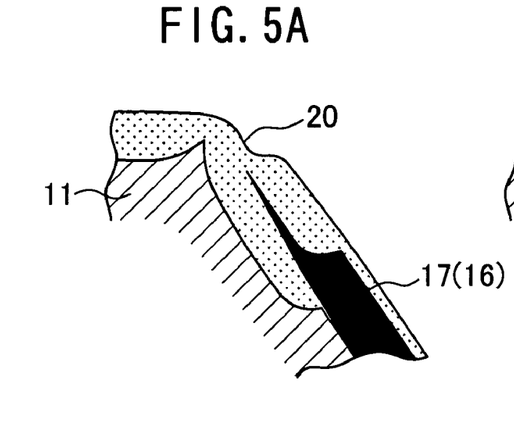
FIGS. 5A and 5B are enlarged views of the step shown in FIG. 4F in the fabricating steps of the cantilever according to the first embodiment.

The manner of the terminal end portion of the probe portion 17 at the time of such low-temperature thermal oxidation treatment is shown in an enlarged manner in FIG. 5A. In particular, when a low-temperature thermal oxidation treatment is performed to oxidize the silicon nitride film 16 for forming the probe portion 17, oxidation is advanced not only from the front side of the silicon nitride film 16 which will become the terminal end portion of the probe portion 17 but also from the back side and two lateral faces of the silicon nitride film 16 which will become the terminal end portion of the probe portion 17. Accordingly, the plate-like silicon nitride film 16 is oxidized from the front and back sides and also from the two lateral faces thereof so that the silicon oxide film 20 be formed. A high aspect ratio is thereby achieved of the terminal end portion of the probe portion 17 where the sharpening is more intense toward its tip.

Figure 5B:
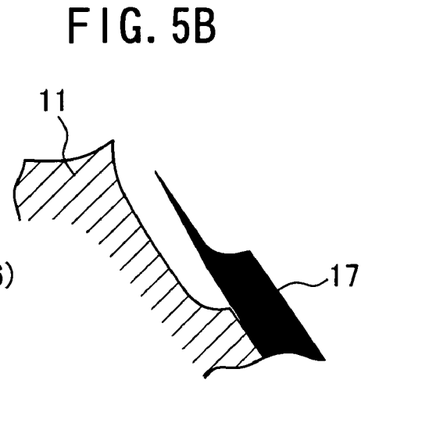

Next, the silicon oxide film 20 is removed by fluoric acid to form the probe portion 17 having a radius of curvature of 20 nm or less as shown in FIG. 5B. Here, since the silicon nitride film 16 of the portion to become the lever portion 18 is covered by the protecting film 19 of the silicon oxide film deposited by CVD method, the silicon nitride film 16 to become the lever portion 18 is not oxidized even by the low-temperature thermal oxidation treatment and thus is not reduced in film volume by the fluoric acid treatment. The flatness of the lever portion is also kept.

Figure 4G:
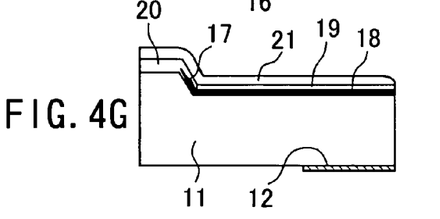

Subsequently to the step shown in FIG. 4F as described, the silicon nitride film 16' on the back side of the silicon substrate 11, which has been protecting the support portion, is then removed so as to expose the support portion mask 12 on the surface, while preserving the protecting film 19 of silicon oxide film and the silicon oxide film 20 due to the low-temperature thermal oxidation treatment as shown in FIG. 4G. A silicon substrate front side protecting film 21 is then formed for example by CVD method to a thickness of about 1 μm.

Figure 4H:
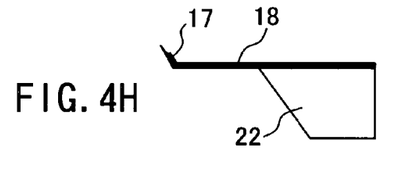

Next, as shown in FIG. 4H, an alkaline etchant for example typically represented by KOH is used to perform anisotropic etching from the side opposite to the projecting direction of the probe portion 17 to form a support portion 22 for holding the cantilever. Thereafter, the protecting film 19, silicon oxide film 20 and front side protecting film 21 are removed.

Finally, as shown in FIG. 4I, a reflecting film 23, if required, is formed on the lever portion 18 on the side opposite to the direction toward which the probe portion 17 is caused to project so that a cantilever 24 having the plate-like probe portion 17 is complete. The reflecting film 23 is formed for example by evaporating gold. The reflecting film, though formed in this case, is not necessarily required, and, in some cases, it is not necessary to form a reflecting film.

A further explanation will be made below with respect to the reason why silicon nitride having greater silicon content is used as the silicon nitride film for constructing the probe portion and lever portion of SPM cantilever according to the first embodiment. In particular, the reason is that the reaction between silicon atoms in the silicon nitride film and oxygen atoms in the oxygen atmosphere is accelerated during the sharpening step so that an advantage of promoting the surface oxidation results. Specifically, while an elemental ratio between silicon (Si) and nitrogen (N) of the silicon nitride film in the range of $0.75 < Si/N \leq 1.3$ is used in the present embodiment, such range is an optimal elemental ratio range for the structure of a thin film such as cantilever. Particularly regarding stress, if the elemental ratio is $Si/N \leq 0.75$, an intense tensile stress of 1,000 MPa or above results. Because of this, warping at the lever portion occurs or the tip of the probe portion is cracked due to stress.

In the range of $Si/N > 1.3$, on the other hand, since Si is polycrystallized and causes a precipitation, the surface coarseness is worsened and it becomes disadvantageous for example for a cantilever in which a smooth lever portion surface or probe portion surface is desired. Also in a subsequent silicon etching process, an etchant may permeate from the polycrystallized silicon portion to result an abnormal etching. To prevent such abnormal etching, the above described elemental ratio range is used.

By such fabricating method, the cantilever made of silicon nitride having a radius of curvature at the tip of the probe portion sharpened to 20 nm or less and at the same time having a high aspect ratio thereof can be readily fabricated without using a high precision apparatus which is expensive. Further, since the probe portion having the sharpened terminal end portion can be fabricated in a well regulated manner and at high yield, costs can also be reduced. Furthermore, batch fabrication and processing of a plurality of cantilevers at wafer level become possible.

In particular, unlike the conventional method in which a resist mask is prepared and an underetching is effected while regulating the etchant and time, the length of the sharpened portion of the probe terminal end portion in the fabricating method according to the present embodiment is not restricted by the limitation due to the permeation of etchant under the mask so that the sharpened portion (terminal end portion) having greater length can be made. Further, in the fabricating method according to the present embodiment, it is adequate that only the oxidized portion formed on the silicon nitride film surface be entirely etched away by fluoric acid. It is thereby also possible to secure far greater processing margin for example in control of the temperature and concentration of etchant and control of etching time as compared to an isotropic wet etching of which control is generally considered to be difficult.

In the case where a further improvement in the aspect ratio of the probe portion or further sharpening of the tip of the terminal end portion is desired, the above described process, i.e., the forming of an oxide film by low-temperature thermal oxidation treatment and the removing of the oxide film by fluoric acid can be repeated for a plurality of times to additionally promote the sharpening. In particular, while a long time is required to form an oxide film of desired film thickness on the silicon nitride film by one time of low-temperature thermal oxidation treatment, a similar result as the forming of the oxide film of the desired film thickness can be obtained in a shorter time period by repeating a plurality of times the forming processing of an oxide film having a film thickness thinner than the desired film thickness. Also, the sharpening of the probe portion can be additionally promoted by previously forming an optimal acute angle pattern of silicon nitride film.

Figure 6:
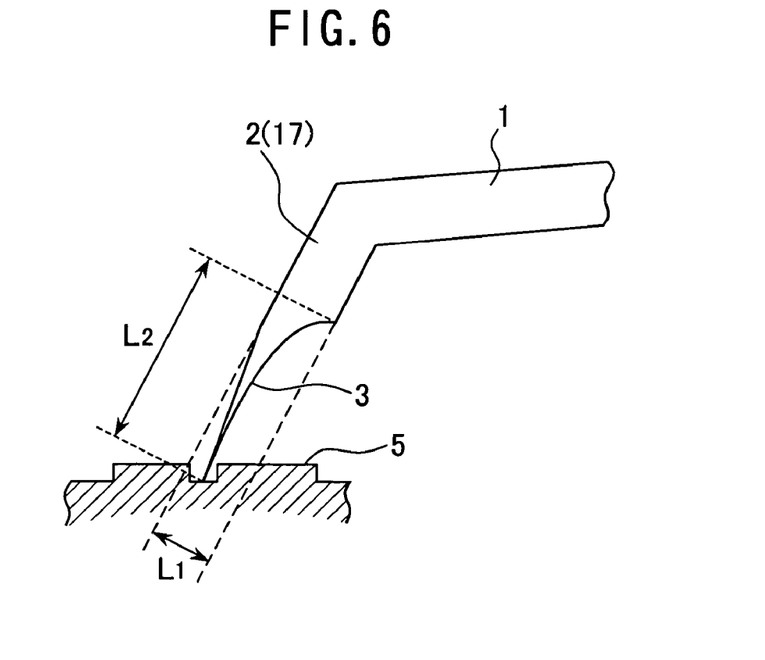
FIG. 6 is an enlarged view typically showing the relation between the probe's terminal end of the cantilever according to the first embodiment of the invention shown in FIG. 2 and a sample to be measured.

Further, the probe portion of the cantilever fabricated as described is in the form of a plate. The terminal end portion 3 of the probe portion 2(17) is located as shown in FIG. 6 inwardly of the imaginary extended planes (indicated by dotted lines) of the two sides of the base portion of the plate-like probe portion 2 so that the tip of the terminal end portion 3 is extended toward the inside of the front and back sides of the plate-like probe portion 2. It is thereby possible for the tip of the probe portion 2 at the time of measuring to contact a sample 5 at a near-perpendicular angle so that the resolution is not likely to be lowered.

The inwardly curved configuration of the terminal end portion 3 of the sharpened probe portion 2 is different from the conventional case as shown in FIG. 1 that depends on isotropic wet etching. In particular, supposing $L_1$ as the plate thickness of the probe portion 2 and $L_2$ as the length of the sharpened terminal end portion 3 of the probe portion 2, the relation of $L_1 \geq L_2$ holds in the conventional cantilever. In the cantilever of the invention, on the other hand, the relation is $L_1 < L_2$ and results in a configuration where the aspect ratio of the sharpened probe terminal end portion 3 is greater. In particular, the length $L_2$ of the sharpened portion (terminal end portion 3) is longer than the thickness $L_1$ of the plate-like probe portion 2. A measurement even on the surface irregularities of the sample 5 thereby becomes possible without causing a portion other than the tip of the probe portion to contact thereat.

Further, of the cantilever according to the present embodiment, the probe portion is located on the free end of the lever portion. The positioning at the time of measuring (scanning) of the probe portion to a location to be observed on the sample can thus be easily effected in a short time by attaching it to SPM apparatus into which an optical microscope is combined. Further, the sample to be measured and the tip of the probe portion can be brought into contact substantially vertically with each other so that a high-resolution measurement becomes possible.

It should be noted that the fabricating method of SPM cantilever according to the present embodiment has been shown as that using RIE in etching the silicon nitride film in the step shown in FIG. 4D. It is however not limited to the use of RIE and other dry etchers such as ICP-RIE or an wet etching for example of hot phosphoric acid can also be used. This is because the surface oxidation is not affected by the configuration of the silicon nitride film before the oxidation step.

Further, since the fabricating method of cantilever explained in the present embodiment is characterized in the sharpening process of the probe portion, it can be applied also to the fabrication of cantilevers of other forms as far as the probe portion is fundamentally made of silicon nitride. For example, even in a cantilever where the probe portion is formed of silicon nitride and the lever portion is made of a single crystal silicon, it is possible to cover the single crystal silicon portion with a protecting mask so as to sharpen only the silicon nitride probe portion by the technique according to the present embodiment. In such cantilever having a lever portion formed of single crystal silicon, a greater lever thickness can be readily achieved so that it is advantageous in those SPM cantilevers of which relatively greater spring constant and higher resonance frequency are required.

In a summary of the fabricating method according to the above first embodiment, since uniform probe portions can be formed all over a wafer by combining the simple processes, i.e., low-temperature thermal oxidation treatment and wet etching process by fluoric acid, it is possible to readily fabricate a cantilever having a generally plate-like probe portion of which the terminal end portion can be sharpened in a well regulated manner and which has a high aspect ratio. Further, since the probe portions of a large number of cantilevers to be formed on a plurality of pieces of wafers can be subjected to the sharpening treatment at once, the yield thereof is high and costs can be reduced. Further, since only the terminal end of the probe portion is oxidized, the oxidation does not affect the lever portion and other parts at all.

Figure 7:
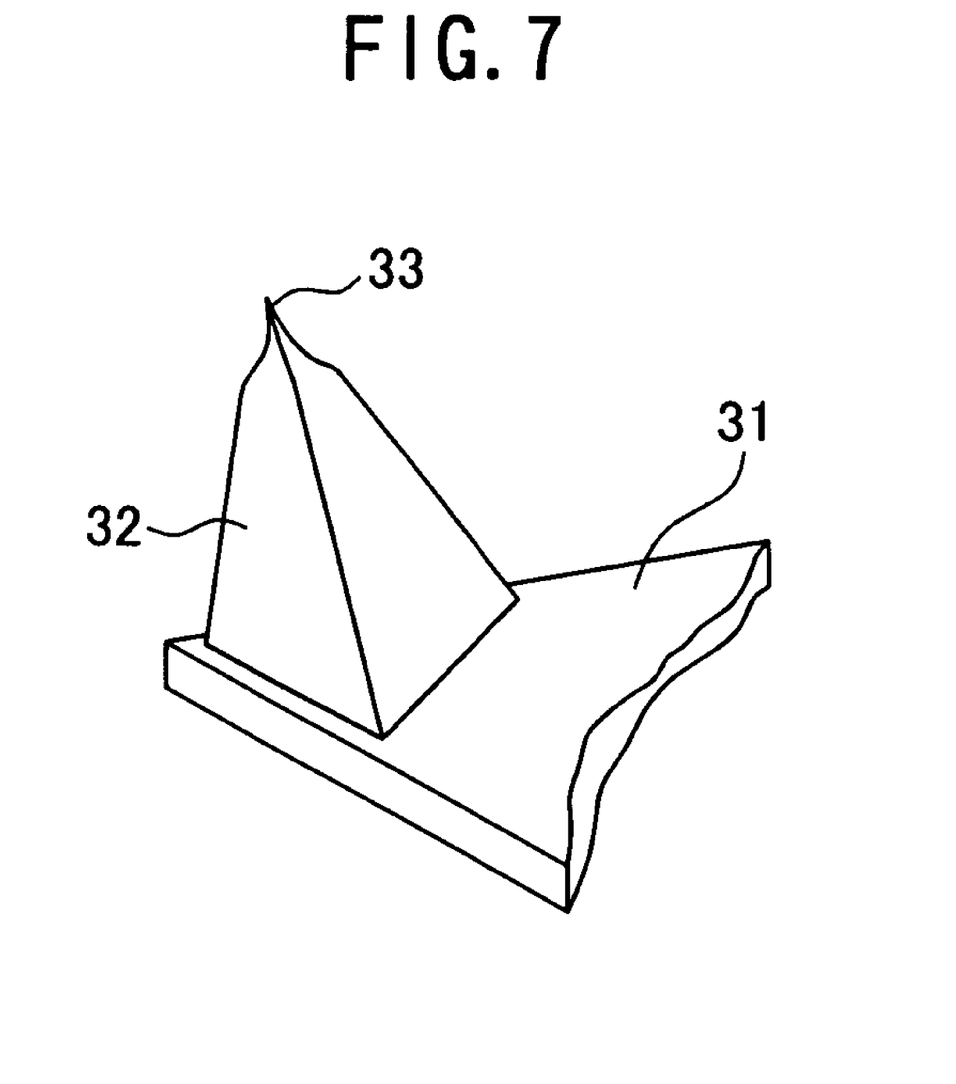
FIG. 7 is a perspective view showing construction of the probe portion of the cantilever according to a second embodiment of the invention.

A second embodiment of the invention will now be described. While the description in the first embodiment has been made with respect to the plate-like probe portion, this embodiment will be described with respect to the probe portion in a pyramidal or conic form, specifically of a triangular pyramid. The structure of the probe portion of cantilever for use in scanning probe microscopy (SPM) according to this embodiment is shown in FIG. 7. Referring to FIG. 7, a probe portion 32 is formed toward the free end of a lever portion 31 extended from a support portion (not shown). Here the probe portion 32 has a triangular pyramidal structure, and a tip 33 of the probe portion is slenderly sharpened by sharpening treatment and points the direction of the free end of the lever portion 31. It should be noted that the radius of curvature of the probe portion tip is extremely sharpened to be 20 nm or less and the probe portion has a high aspect ratio.

By thus forming the probe portion into a pyramidal or conic form, the probe portion is provided with a high mechanical rigidity so that the mechanical characteristics of SPM cantilever can be stabilized and the strength of the probe portion can be increased. The cantilever is achieved as having the probe portion which is additionally sharpened at the terminal end portion thereof and has a length required for measuring relatively large surface irregularities of a sample.

Further, by forming the probe portion into a triangular pyramidal form, it can be readily fabricated and steady measurements become possible. It is also possible to form the probe portion into a circular cone. In such case, steady measurements become possible due to the fact that the terminal end portion of the probe portion becomes symmetrical.

The fabricating steps of cantilever according to the second embodiment will now be described by way of FIGS. 8A to 8K. First, a silicon wafer of lattice plane (100) having Orientation Flat in <011> direction is prepared and used as a substrate 41. Next, as shown in FIG. 8A, a mask 42 for forming the support portion is formed by a silicon oxide film at a predetermined location on the back side of the silicon substrate 41.

Figures 8A, 8B:
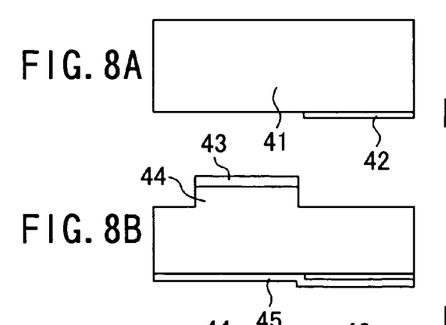
FIGS. 8A to 8K illustrate the fabricating steps for explaining the fabricating method of the cantilever according to the second embodiment shown in FIG. 7.

Next, a mask 43 for forming a convex portion is formed on the silicon substrate 41 and, as shown in FIG. 8B, a vertical etching of the silicon substrate front side is effected to a depth of the order of the probe length by Deep-RIE (Reactive Ion Etching) to form a convex portion 44 for forming the probe portion. Here a silicon nitride film is suitably used as the convex portion forming mask 43. Further, at the time of forming the mask 43 of silicon nitride film, a protecting film 45 of silicon nitride film is also formed on the back side of the silicon substrate 41.

Figure 8C:
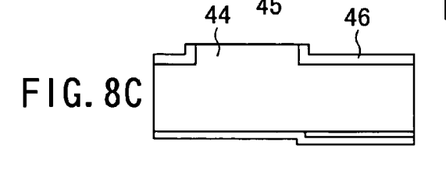

Next, after effecting thermal oxidation with preserving the mask 43 to form a silicon oxide film 46 over the entire surface, the silicon nitride film 43 on the convex portion 44 and the silicon oxide film 46 formed on the silicon nitride film 43 are removed as shown in FIG. 8C. A heat phosphoric acid for example is suitably used for the removal of the silicon nitride film 43.

Figure 8D:
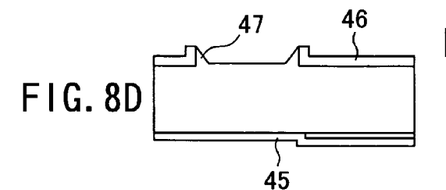

Next, as shown in FIG. 8D, the convex portion 44 having an exposed silicon substrate surface thereon is subjected to anisotropic wet etching for example by potassium hydroxide (KOH) solution. The difference in etching rates of lattice plane orientation of silicon is then used to form a silicon surface projection 47 in a triangular pyramidal form constructed by lattice plane (111). Here the depth of etching suffices to be of the same level as the probe length.

Figure 9A:
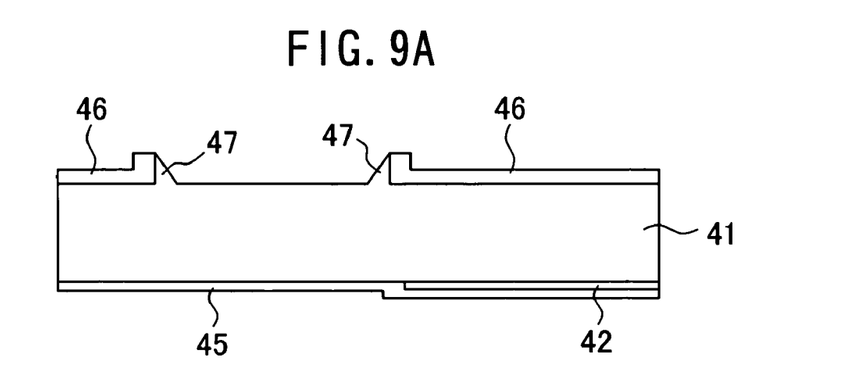
FIGS. 9A and 9B illustrate in detail the step shown in FIG. 8D in the fabricating steps of the cantilever according to the second embodiment.
Figure 9B:
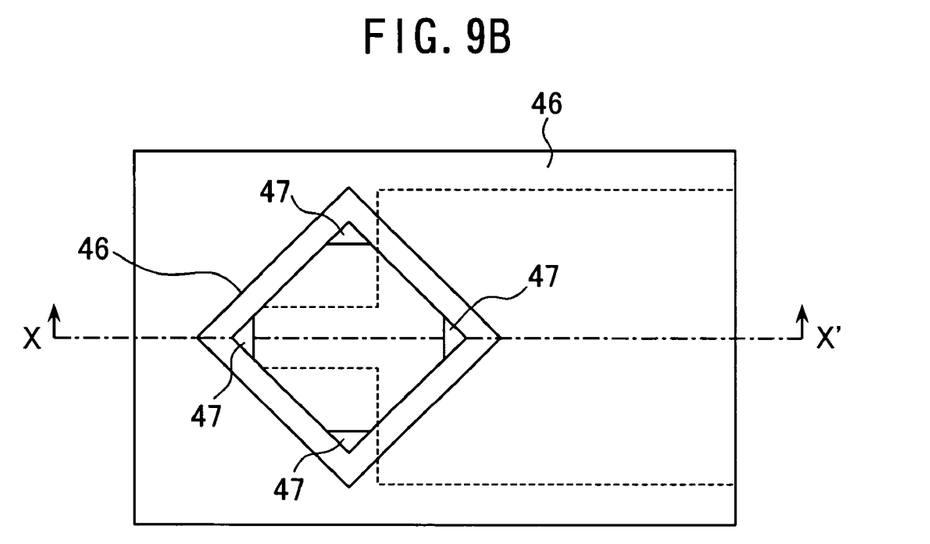

The processing step of forming the triangular pyramidal silicon surface projection 47 will now be described in further detail by way of FIGS. 9A and 9B. FIG. 9A is an enlargement of FIG. 8D and is a sectional view along line X–X' of the top view shown in FIG. 9B. The convex portion forming mask 43 shown in FIG. 8B is rhombus-shaped so that the probe portion forming convex portion 44 shown in FIG. 8C is formed in a rhombus. Accordingly, if the silicon oxide film 46 formed on the substrate front side and the lateral faces of the rhombus convex portion as shown in FIG. 8C is used as the mask to effect an anisotropic wet etching of the convex portion 44, triangular pyramidal silicon surface projections 47 are formed on the four corners of the rhombus convex portion 44 as shown in FIGS. 9A and 9B. It should be noted that, in FIG. 9B, the dotted line indicates the configuration of the patterning of cantilever to be performed in a subsequent step.

Figure 8E:
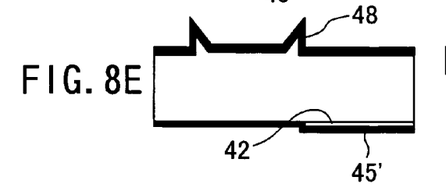

Next, as shown in FIG. 8E, after etching the silicon oxide film 46 formed on the front side of the silicon substrate 11 for example by fluoric acid and also removing the protecting film 45 of silicon nitride film formed on the back side of the silicon substrate 11 by heat phosphoric acid, a silicon nitride film 48 having a greater silicon content than a normal silicon nitride film to become the lever portion and probe portion is deposited by LP-CVD. In particular, this can be achieved by increasing the ratio of dichlorosilane in the flow ratio of dichlorosilane and ammonia at the time of deposition. Here the tip of the silicon nitride film 48 to become the probe portion has a radius of curvature of about 50 nm. At the same time, a silicon nitride film similar to the silicon nitride film 48 deposited on the back side of the silicon substrate is used again as a protecting film 45' of the support portion forming mask pattern 42 on the back side of the wafer.

Figure 8F:
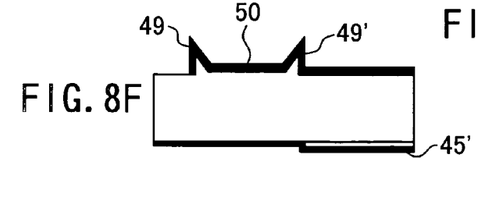

Next, as shown in FIG. 8F, the deposited silicon nitride film 48 is patterned into the shape of a cantilever by photolithography and the silicon nitride film 48 is etched for example by RIE (Reactive Ion Etching) to form a probe portion 49 and lever portion 50. It should be noted that a projection 49' of an identical configuration as the probe portion 49 is also formed at the same time.

Figure 8G:
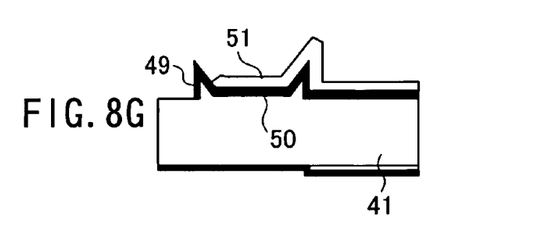

Subsequently, as shown in FIG. 8G, after depositing a silicon oxide film to a thickness of about 0.5 μm by CVD method, the silicon oxide film over the terminal end portion of the probe portion 49 and on the silicon substrate 41 in a vicinity thereof is removed while preserving it only over the lever portion 50 containing the projection 49' as a protecting film 51.

Figure 8H:
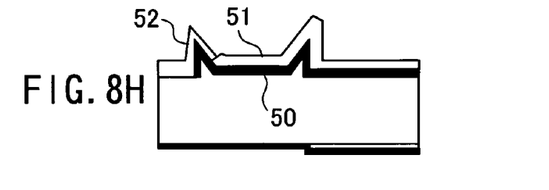

Next, the sharpening of the probe portion 49 is effected. As shown in FIG. 8H, a low-temperature thermal oxidation treatment is first effected to form an oxide film 52 only over the probe portion 49 and on the silicon substrate surface in a vicinity thereof other than the region where the protecting film 51 is formed. Here the low-temperature thermal oxidation treatment is effected in a steam atmosphere; and, in order to obtain a sharpening effect, the treatment is preferably of such a level that the film thickness of the oxide film on the silicon substrate surface becomes 50 nm or more under the temperatures above 900° C. and below 1050° C.

The reason for setting the temperature of the thermal oxidation treatment in this manner is that oxidation is caused to unevenly proceed from the silicon nitride film surface of the probe portion 49 by lowering the oxidizing temperature so that a sharpened part can be formed on the silicon nitride film of the portion not oxidized. Further, the reason for defining the film thickness of the oxide film on the silicon substrate surface as described is that, if the film thickness thereof is too thin, an adequate sharpening effect of the probe portion 49 formed of silicon nitride film is difficult to be obtained. By such low-temperature thermal oxidation treatment, the silicon nitride at the terminal end portion of the probe portion 49 is reduced in its film thickness and sharpened in a similar manner as the first embodiment.

In particular, when the low-temperature thermal oxidation treatment is effected to oxidize the silicon nitride film for forming the probe portion 49, the surface of the silicon nitride film at the probe terminal end portion is oxidized from the surrounding of the triangular pyramidal silicon nitride film so as to form an oxide film. A high aspect ratio of the probe portion 49 is thereby achieved such that the sharpening is more intense toward the tip thereof. Accordingly, by removing the oxide film 52 by fluoric acid at a subsequent step, a probe portion having a radius of curvature of 20 nm or less is formed. Here, since the silicon nitride film of the portion becoming the lever portion 50 is covered by the protecting film 51 deposited by CVD method, the silicon nitride film constituting the lever portion 50 is not oxidized even by the low-temperature thermal oxidation treatment and thus is not reduced in film volume by the fluoric acid treatment. Further, the flatness of the lever portion is also kept.

Figure 8I:
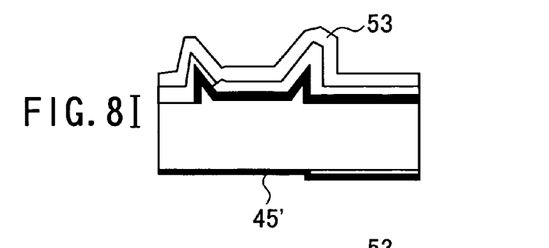
Figure 8J:
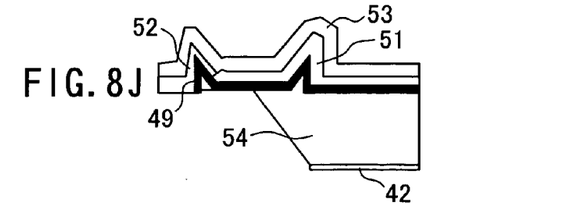

Subsequently to the processing step shown in FIG. 8H as described, a silicon oxide film 53 by CVD method is then formed as shown in FIG. 8I as a protecting film of cantilever all over the front side of the silicon substrate. Next, as shown in FIG. 8J, the protecting film 45' on the back side of the silicon substrate is removed and an alkali etchant typically represented for example by KOH is used to effect anisotropic etching from the side opposite to the projecting direction of the probe portion 49 to form a support portion 54 for holding the cantilever.

Figure 8K:
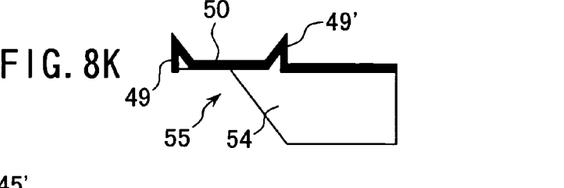

Finally, as shown in FIG. 8K, the silicon oxide film 53 by CVD method formed all over the front side of the silicon wafer as the protecting film of the cantilever, the protecting film 51 of the silicon oxide film, and the oxide film 52 by low-temperature thermal oxidation treatment, as well as the support portion forming mask 42 are etched away by fluoric acid to complete a cantilever 55 having the triangular pyramidal probe portion 49. Here, while the projection 49' of the configuration similar to the probe portion 49 is also formed in addition to the probe portion, this causes no problem if the original mask pattern is formed so that it be formed at a position other than the lever portion 50 causing no obstacle in measurements (for example on the support portion 54).

Here silicon nitride having greater silicon content is used as the probe portion 49 and lever portion 50 for the reason as follows. While, also in this embodiment, an elemental ratio between silicon (Si) and nitrogen (N) of the silicon nitride film in the range of 0.75<Si/N≦1.3 is used, such range is an optimal elemental ratio range for the structure of a thin film such as cantilever. Particularly regarding stress, if the elemental ratio is Si/N≦0.75, an intense tensile stress of 1,000 MPa or above results. Because of this, warping at the lever portion occurs or the tip of the probe portion is cracked due to stress. In the range of Si/N>1.3, on the other hand, since Si is polycrystallized and causes a precipitation, the surface coarseness is worsened and it becomes disadvantageous for example for a cantilever in which a smooth lever portion surface or probe portion surface is desired. Also in a subsequent silicon etching process, an etchant may permeate from the polycrystallized silicon portion to result an abnormal etching. To prevent such abnormal etching, the above described elemental ratio range is used.

By such fabricating method, the cantilever made of silicon nitride having a radius of curvature at the tip of the probe portion sharpened to 20 nm or less and at the same time having a high aspect ratio can be readily fabricated without using a high precision apparatus which is expensive.

Further, since the probe portion having the sharpened terminal end portion can be fabricated in a well regulated manner and at high yield, costs can also be reduced. Furthermore, batch processing of a plurality of cantilevers at wafer level becomes possible.

In particular, unlike the conventional method in which a resist mask is prepared and an underetching is effected while regulating the etchant and time, the length of the sharpened portion of the probe terminal end portion in the fabricating method according to the present embodiment is not restricted by the limitation due to the permeation of etchant under the mask so that the sharpened portion (terminal end portion) having greater length can be made. Further, in the fabricating method according to the present embodiment, it is adequate that only the oxidized portion formed on the silicon nitride film surface be entirely etched away by fluoric acid. It is thereby also possible to secure far greater processing margin for example in control of the temperature and concentration of etchant and control of etching time as compared to an isotropic wet etching of which control is generally considered to be difficult.

In the case where a further improvement in the aspect ratio of the probe portion or further sharpening of the tip of the terminal end portion thereof is desired, the above described process can be repeated for a plurality of times to additionally promote the sharpening.

Further, of the cantilever having the plate-like probe portion as described in the first embodiment, i.e., bird's-beak probe portion, the rigidity of the probe portion is lowered when the length of the probe portion is increased. In performing measurements by attaching it to a scanning probe microscopy, therefore, the probe portion is easily distorted and it becomes difficult when acted upon by a force exerted from a sample to accurately ascertain surface irregularities of the sample. Of the cantilever having the triangular pyramidal probe portion described in the present embodiment, however, the mechanical rigidity of the probe portion is high and the surface irregularities of a sample can be accurately ascertained even if the probe length is made longer.

It should be noted that the present embodiment has been shown as that using RIE in etching the silicon nitride film in the step shown in FIG. 8F. It is however not limited to the use of RIE and other dry etchers such as ICP-RIE or an wet etching for example of hot phosphoric acid can also be used. This is because the surface oxidation is not affected by the configuration of the silicon nitride film before the oxidation step.

The fabricating method according to the above second embodiment is summarized as follows. Since uniform probe portions can be formed all over a wafer by a combination of simple processes, namely, low-temperature thermal oxidation and wet etching by fluoric acid, it is possible to readily fabricate a cantilever of which the terminal end portion can be sharpened in a well regulated manner and which has a pyramidal or conic probe portion having a high aspect ratio. Further, since the probe portions of a large number of cantilevers to be formed on a plurality of pieces of wafer can be formed by sharpening them at once, the yield thereof is higher and costs can be reduced.

Further, the present embodiment has been shown as that using a triangular pyramidal probe portion as the probe portion because of the feasibility of readily and dependably forming a projection terminating at a point. The probe portion in the form of a pyramid or cone according to the present embodiment, however, is not limited to a triangular pyramidal form and naturally also applicable to a probe portion in the form of a circular cone. In the case of the circular-conic probe portion, it suffices to apply an overcoating of silicon nitride over a silicon projection in the form of a circular cone. With the circular-conic probe portion, the mechanical rigidity becomes higher and the terminal end portion of the probe portion becomes bilaterally symmetrical, and the tip thereof is further sharpened so that stable measured images can be obtained without being influenced by the scanning direction of cantilever in SPM measurements. Further, the cantilever can be achieved as having a probe portion of which the tip is dependably sharpened and which has a sufficient length even in the case of measuring a sample having greater surface irregularities.

What is claimed is:

1. An SPM cantilever comprising
a support portion;
a lever portion extended from the support portion; and
a probe portion formed at a free end of the lever portion;
wherein said probe portion has a generally plate-like form and is inclined by a certain angle from the plane of said lever portion;

the probe portion has an additionally sharpened terminal end portion;

the terminal end portion has its length greater than the plate thickness thereof and is reduced gradually in thickness toward a tip of the terminal end portion; and the tip is located inwardly of the planes extended from the front and back sides of a base portion of the plate-like probe portion;

two sides of said probe portion containing said terminal end portion are inwardly bent each other; and the tip of said terminal end portion is terminated only at one point.

2. The SPM cantilever according to claim 1, wherein said probe portion is formed of silicon nitride.

* * * * *